United States Patent [19]
Clarkson

[11] Patent Number: 5,651,527
[45] Date of Patent: Jul. 29, 1997

[54] SUPPORT STRUCTURE FOR USE WITH HEAVY EQUIPMENT

[76] Inventor: Michael Clarkson, 3035 15th St., Boulder, Colo. 80304

[21] Appl. No.: 505,672

[22] Filed: Jul. 21, 1995

[51] Int. Cl.⁶ .................................... F16M 5/00
[52] U.S. Cl. .................. 248/676; 248/354.5; 414/498
[58] Field of Search .................. 414/498; 248/188.5, 248/354.5, 676, 677, 678

[56] References Cited

U.S. PATENT DOCUMENTS

| | | | |
|---|---|---|---|
| 2,925,930 | 2/1960 | Parks | 414/498 |
| 3,073,463 | 1/1963 | Parks | 414/498 X |
| 3,152,709 | 10/1964 | Fowler | 414/498 X |
| 3,180,511 | 4/1965 | Huisman | 414/498 |
| 3,332,661 | 7/1967 | Hand | 414/498 X |
| 3,773,199 | 11/1973 | Arvidsson | 414/498 |
| 3,995,760 | 12/1976 | Burgdorf et al. | 414/498 |
| 4,076,299 | 2/1978 | Dalton | 414/498 X |
| 4,390,286 | 6/1983 | Regaldo | 414/498 X |

*Primary Examiner*—Ramon O. Ramirez
*Attorney, Agent, or Firm*—Timothy J. Martin; Michael R. Henson

[57] ABSTRACT

A support structure is adapted to support vehicle-mounted equipment in an elevated stored state above ground and further adapted to mount onto a bed of a vehicle to assist in loading and off-loading of equipment. The vehicle comprises a support frame, first and second rigid leg structures mounted to the support frame, and a pair of stop elements. The first rigid leg structure includes a first pair of legs each pivotally mounted to the support frame on a respective pivot axis so that each leg includes a ground engaging portion located on one side of the axis and a second portion located on another side of the axis. Each of the legs is pivotable between a support position wherein the first portion engages the ground and stowed position wherein the leg is oriented proximate to the support frame with the second portion extending into a region between the support frame and a respective pivot axis. Each of the stop elements is selectively movable into the region to define a stop position wherein the stop element obstructs the region to prevent pivoting of the respective leg into the stowed position. The stop element is further movable out of the region to permit pivoting of the respective leg into the stowed position.

20 Claims, 6 Drawing Sheets

SUPPORT STRUCTURE FOR USE WITH HEAVY EQUIPMENT

FIELD OF INVENTION

The present invention is directed to a support structure adapted to support equipment in an elevated stored state above the ground. The present invention more particularly relates to a free-standing support structure for supporting heavy vehicle-mounted equipment and assisting in loading and off-loading the equipment relative to a bed of the vehicle so that the equipment and the support structure may be transported from one location to another with relatively little difficulty.

BACKGROUND OF THE INVENTION

Support structures are used in a wide variety of environments today for the purpose of storing items for a selected duration of time. Some of these support structures, such as wooden pallets used in industrial environments, are adapted to store stacked items in an elevated state above the ground for access at a later time by a vehicle. Other structures are more durable in construction and provide support for heavier items. These include, among other types, steel frames used predominately in the shipping industry.

Regardless of the type of support structure utilized, it is often desirous to load and off-load items onto a vehicle for transportation to a desired location or to load and off-load equipment that is used while being transported such as, for example, equipment for road deicing, sanding or salting. For most loads, however, manual labor is too inadequate and potentially dangerous and the assistance of a vehicle, such as a forklift or a crane, is required. Even these vehicles, though, are of little practical use for many applications.

The public works departments of many cities are frequently called upon to maintain access routes in a safe condition for use by the general public. For instance, when winter weather conditions become severe, the public works department is responsible for depositing salt or sand on the roads to alleviate any unnecessary risk of harm to commuters. At other times it may be necessary to deposit other compounds on the roads. Irrespective of the particular application, a truck or other comparable vehicle is required to transport these compounds which compounds are typically stored in large cargo containers. Because these containers can be quite heavy and need to be accessed in a short amount of time in order to satisfy everyday demands, it is desirous to efficiently load and off-load the containers onto the bed of a vehicle, and various solutions have been developed in an attempt to accomplish this objective.

One such solution has been to suspend the containers in an elevated state above the ground so that a vehicle operator can position the vehicle's bed under the container for loading purposes. Typically, the containers are suspended by a number of chains which interconnect them to an overhead support frame. Several containers may be suspended next to each other in this fashion. A problem with this approach, however, is that the structure is somewhat precarious in design and can become unstable or unsturdy from continued use, resulting in potential damage to either the containers themselves or anyone in the near vicinity of the support structure.

Another type of support structure which has found extensive use in the area is a generally rectangular steel frame which has a plurality of support legs (usually four) and which is adapted to securely support a container in an elevated condition. Two of the support legs are pivotally connected to a first end of the support frame, while the remaining two rear legs are connected to a second end of the support frame and retractable relative thereto.

Both the steel frame and the container may be loaded onto a hydraulically actuated bed of a vehicle by slightly elevating the bed and backing up the vehicle until the bed Is positioned underneath a portion of the support surface proximate the pivotal legs. At this point, a user pivots the pivotable legs into a stowed, horizontal condition proximate to the support frame. Then, once the support structure and the container are properly positioned on the vehicle's bed, retractable legs may be adjusted into a retracted state. The entire device is now loaded onto the truck bed and transportable to the desired location. While these prior art support structures have prove quite useful, a problem with their construction is that improper positioning of the truck bed may cause the support legs to pivot prematurely which can result in collapse of the entire structure.

Accordingly, numerous needs exist to overcome the deficiencies inherent in prior art support structures. One such need is to provide a support structure that is better equipped to supporting heavy cargo in an elevated state yet that is adapted to facilitate the loading and off-loading of the cargo onto the bed of a carrier vehicle. Another need is to provide a support structure which is more durable in construction. It is from these considerations and others that the present invention has evolved.

SUMMARY OF INVENTION

It is an object of the present invention to provide a new and useful support structure which is capable for supporting vehicle-mounted equipment in an elevated stored state above the ground.

Another object of the present invention is to provide a support structure which may better assist in loading and off-loading vehicle-mounted equipment relative to a bed of a vehicle with a reduced risk of collapse during loading procedures.

A still further object of the present invention is to provide a free-standing support structure which is relatively easy to manufacture, yet which has a more durable construction existing comparable structures.

Yet another object of the present invention is to provide a support structure for vehicle-mounted equipment which is pivotable to permit loading and off-loading of the equipment onto the bed of the vehicle.

The present invention is directed to a support structure which is adapted to support vehicle-mounted equipment is an elevated stored state above the ground. The support structure according to the present invention is further adapted to mount onto a bed of the vehicle thereby to assist in loading and off-loading of the equipment relative to the bed.

In its broadest form, the support structure comprises a support frame adapted to receive and support the equipment in the stored state, a first rigid leg structure pivotally mounted to the support frame, a second rigid leg structure mounted to the support frame and a pair of stop elements. The first rigid leg structure includes a first pair of legs, each of which Is pivotally mounted to the support frame on respective pivot axles such that each of the legs includes a first ground engaging portion located on one side of the axle and a second portion located on the other side of the axle. Each of the legs of the first rigid leg structure is pivotable between a support position wherein the first portion engages the ground and a stowed position wherein the leg is oriented proximately to or alongside the support frame with the second portion extending into a region between the support frame and the axle. Preferably, the support frame is constructed to prevent additional pivoting of each of the legs beyond the stowed position. This may be accomplished by providing a shoulder associated with each of the first pair of legs, which shoulder is mounted to the interior of the support frame and preferably formed as a rectangular plate.

Each of the pair of stop elements is selectively movable into the region between the frame and the axle of a respective one of the legs to define a stop position wherein the stop member obstructs the region thereby preventing pivoting of the respective leg into the stowed position. Each of the stop elements is also movable out of the region to permit pivoting of the respective leg into the stowed position.

The support frame is preferably rectangular in construction and includes a pair of elongated members each having a first end portion mounted to a respective one of the first pair of legs and a second end portion mounted to the second leg structure. The first end portions may be interconnected by a roller bar which is journaled for rotation relative to the support frame. This roller bar may be rotatably supported by a pair of opposed spaced apart axles.

It is preferred that both the first leg structure and the second leg structure be mounted interiorly of the support frame and that the second leg structure include a second pair of legs, each of which is selectively adjustable in length between an extended state and a retracted state. Each of these legs may be constructed to include a hollowed upper portion and a lower portion telescopically received within the hollowed upper portion and a removable pin which is insertable through the upper portion and the lower portion to selectively retain the leg between the extended state and the retracted state. Preferably, a handle is provided and is connected to each lower portion to facilitate manual adjustment of its respective leg between the extended state and the retracted state.

Each of the stop elements is pivotally coupled to the support frame for movement into and out of the region, and it is preferred that they are movable in a first plane that is transverse, and preferably perpendicular, to a second plane within which their respective legs are pivotable. These stop elements may be pivotally coupled to the support frame by a cross-piece which has a first end mounted to a bracket on the support frame and a second end connected to its respective stop element such that the cross-piece is also pivotable in a plane which is perpendicular to the plane within which its respective leg is pivotable. It is preferred that each of the stop elements be rectangular in configuration and have a surface which is a facing relationship to the second portion of its respective leg when the leg is in the support position and the stop element is in the stop position.

These and other objects of the present invention will become more readily appreciated and understood from a consideration of the following detailed description of the exemplary embodiments of the present invention when taken together with the accompanying drawings, in which:

DETAILED DESCRIPTION OF THE EXEMPLARY EMBODIMENTS

The present invention is directed to a support structure which is adapted to support vehicle-mounted equipment in an elevated stored state above the ground, and which is further adapted to assist in loading and off-loading of the equipment relative to a bed of the vehicle. The present invention is particularly useful in providing a storage structure for relatively heavy equipment when the equipment is not in use, yet which is capable of facilitating the loading and off-loading of the equipment when it is desirous to transport the equipment from one location to another.

Figure 1:
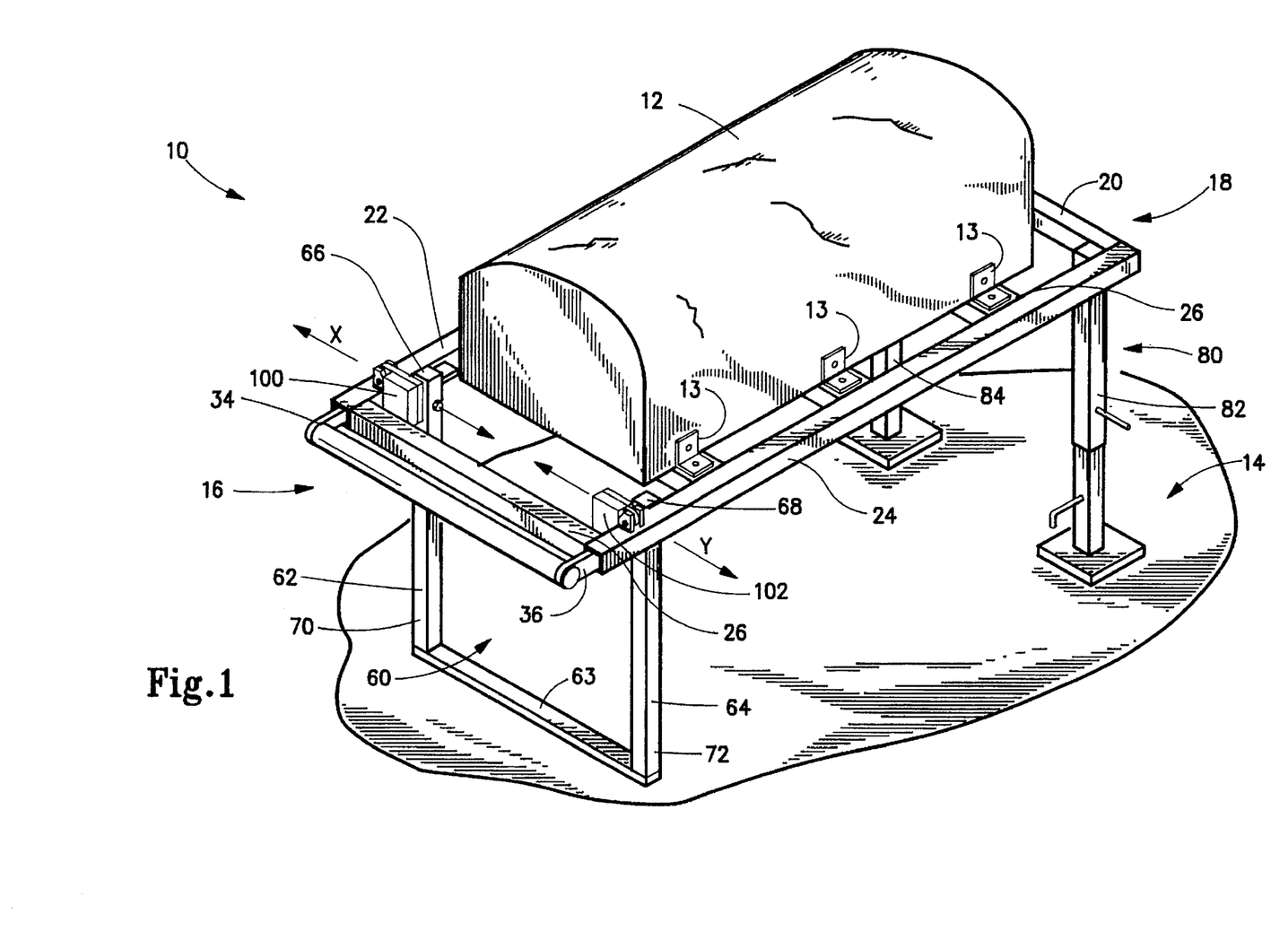
FIG. 1 is a perspective view of an exemplary embodiment of the support structure of the present invention shown supporting a container on a support surface.

To this end, then, the support structure 10 according to the present invention Is generally shown in FIG. 1 in its erected state supporting equipment, shown here as a container 12 for any of a wide variety of contents, such as salt or sand to be deposited on roadways.

As is shown in this figure, support structure 10 supports container 12 and its contents in an elevated state above support surface 14 and broadly includes a support frame 20, first and second leg structures 60 and 80 mounted to the support frame and a pair of stop elements 100 and 102. Support frame 10 is formed by a pair of elongated, spaced apart beams 22 and 24 which extend from the front 16 of support structure 10 to the rear 18. Elongated beams 22 and 24 are preferably parallel and are formed as tubular members of square-shaped cross-section. Beams 22 and 24 are interconnected by a plurality of transversely extending beams 26 to form a rectangular framework for supporting container 12 in the elevated state. As shown in FIG. 1, container 12 is secured to support frame 20 by mounting brackets 13.

First leg structure 60 is located at the front 16 of support structure 10 and includes a first pair of rigid legs 62 and 64 which are each pivotally mounted to support frame 20 along respective pivot axes X and Y. Legs 62 and 64 are mounted intertorly of support frame 20 proximate the front 16 and between two of the transverse beams 26 and are connected by a brace 63. Legs 62 and 64 are also elongated tubular members having a square-shaped cross-section, and each includes a first portion 66 and 68 located, respectfully, above axes X and Y and a second portion 70 and 72 located, respectively, below axes X and Y for engaging support surface 14. Each of legs 62 and 64 are pivotable between a support position wherein the first portions 66 and 68 engage support surface 14 and a stowed position wherein legs 62 and 64 are oriented proximate to and alongside support frame 20, as will be discussed in greater detail below with reference to FIG. 4(c).

Second leg structure 80 includes a second rigid pair of legs 82 and 84 which are also mounted interiorly of support frame 20 proximately to rear 18. Each of legs 82 and 84 is a telescoping member which may be adjusted to selected relative extensions, as will be described later with reference to FIG. 5.

Figure 2:
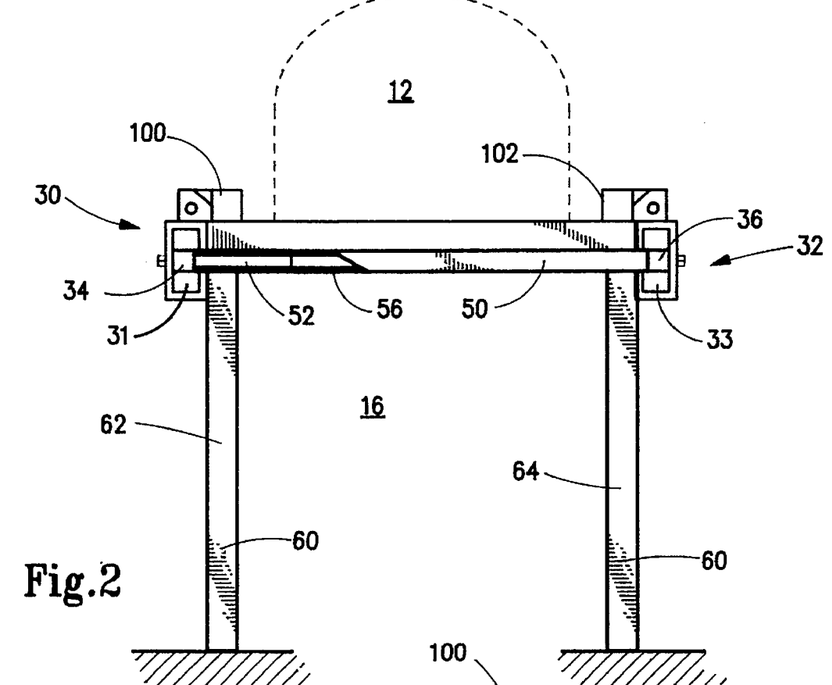
FIG. 2 is a front elevational view of the support structure according to the exemplary embodiment of the present invention (with the container shown in phanthom), specifically showing the construction of the roller bar.

As shown in FIG. 2, front 16 of support structure 10 includes a roller bar 50 which extends in a transverse direction between the front of elongated beams 22 and 24. Roller bar 50 is mounted to first ends 30 and 32 of elongated beams 22 and 24, respectively, by welding or other conventional means. Elongated beams 22 and 24 have their first ends 30 and 32 formed as cavities, 31 and 33, respectively, within which interconnecting arms 34 and 36 are respectively received. Roller bar 50 includes a central rotatable portion 56 is journaled for rotation about a pad trunnion axles, such as axle 52, which each extend transversely inward from interconnecting arms 34 and 36. A first exemplary construction and the pivotable movement of a representative stop element 100 and its associated leg 62 may be seen with reference to FIGS. 3 and 4(a)–4(c). While these figures only represent the construction of one of the stop elements and its associated leg, it should be appreciated that leg 64 and its associated stop element 102 may be constructed identically. In each of these figures, leg 62 is pivotally mounted to elongated beam 22 rearwardly of stop element 100 and roller bar 50. It is preferred that leg 62 be formed as a hollowed body of rectangular cross-section with a mounting wall 78 in facing relationship to a flat interior wall 39 of elongated beam 22. Leg 62 is mounted to beam 22 by a nut and bolt combination including a bolt 58 which is sized and adapted to threadedly engage nut 61 which may be a locking stop nut. Bolt 58 passes through opposed holes 21 formed within opposite sides of beam 22 and through holes 57 in leg 62. When mounted as such bolt 58 and nut 61 form an axle about which leg 62 is able to pivot first in a plane that is parallel to flat face 39. Rod 63 is affixed in the interior of leg 62 to reinforce the upper portion 66 against collapse under a load. A shoulder element 74 is welded to interior wall 39 which acts as a barrier to prevent leg 62 from pivoting in this first plane beyond the stowed position. Shoulder 74 is formed as a rectangular plate and includes a cylindrical portion 75 which provides a roll surface for leg 62 and specifically wall 77 thereof, as leg 62 pivots toward the stowed position.

Figure 3:
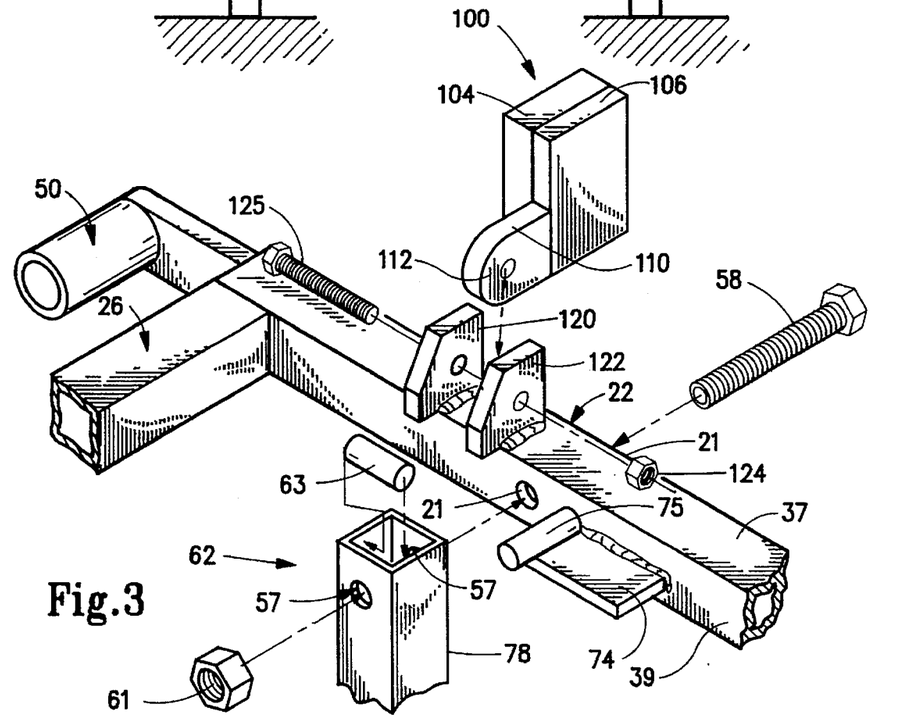
FIG. 3 is an exploded perspective view, partially broken away, showing the construction and mounting of a representative stop element according to the exemplary embodiment of the present invention and its associated leg of the first leg structure.

Stop element 100 is preferably disposed between leg 62 and transverse beam 26. Stop element 100 is of a rectangular construction and includes a pair of rectangular plates 104 and 106 which are fastened to a crosspiece 110 that In turn is interleaved between a pair of spaced apart upstanding brackets 120 and 122 affixed to an upper surface 37 of elongated beam 22. Preferably, plates 104 and 106 have different dimensional widths and cross-piece 110 is formed integrally with plate 106 so that the combination forms an L-shaped member. Cross-piece 110 includes a monolytic portion 112 which is mounted for pivotal movement between brackets 120 and 122 by matable nut and bolt fasteners 124 and 125 which extend through brackets 120 and 122 and cross-piece 110. This permits stop element 100 to pivot in a second plane which is preferably perpendicular to the first plane in which leg 62 pivots.

Figure 4A:
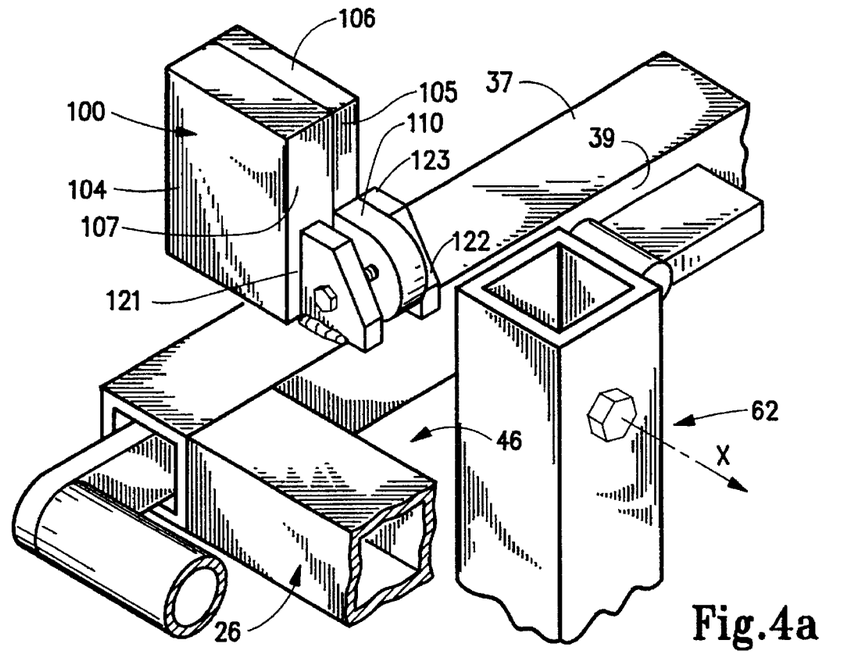
FIGS. 4(a)–4(c) are perspective views of a stop element and its associated first (front) support leg showing different orientation positions therefor.
Figure 4B:
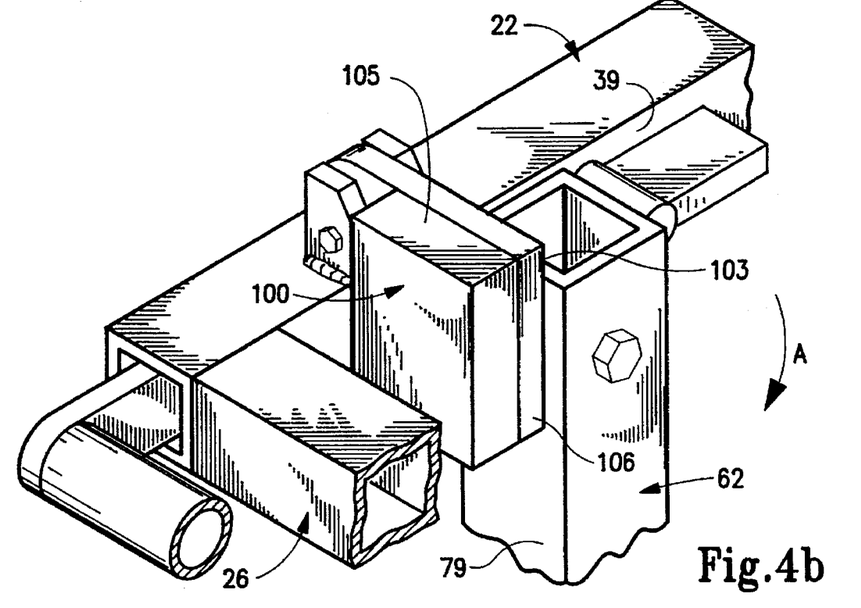
Figure 4C:
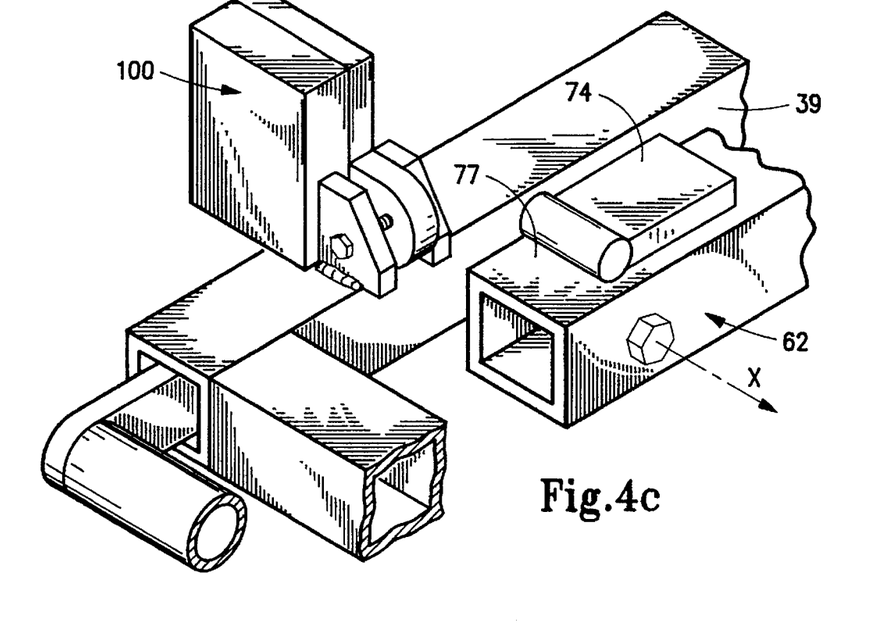

FIGS. 4(a)–4(c) show the pivotability of stop element 100 into and out of a region 46 which is located between axis X, interior wall 39 and transverse beam 26. FIG. 4(a) depicts one of the positions stop element 100 may assume when leg 62 is in the erected support position of FIG. 1. Here stop element 100 is pivoted to a position which is outside of the space or region 46 so that it does not obstruct pivotal movement of leg 62 in the first plane. In this position, cross-piece 110 extends transversely to elongated beam 22 and adjacent edges 105 and 107 of plates 104 and 106 are respectively disposed in a facing relationship to upper surface 37 of beam 22 and outwardly facing walls 121 and 123 of brackets 120 and 122.

In FIG. 4(b) stop element 100 is shown pivoted into region 46 so that edges 107 are now in abutting relationship to interior wall 39 of elongated beam 22. In this position, stop element 100 operates to prevent any pivotal movement of leg 62 in the first plane in the direction of arrow "A". In the event of such a happening, either inadvertent or otherwise, wall 79 of the upper or first portion 66 of leg 62 will contact rearwardly facing surface 103 of plate 106 to obstruct any further pivotal movement of leg 62.

FIG. 4(c) shows stop element 100 pivoted outside of region 46 to the position described above with reference to FIG. 4(a) to permit leg 62 to be pivoted about axis X and into the stowed position. Here, leg 62 is oriented alongside and proximate to interior wall 39 and is prevented from pivoting beyond the stowed position by shoulder 74 mounted to wall 39. In FIG. 4(c), leg 62 is not prevented from returning to the support position. However, as will be understood shortly in reference to the operation of the support structure 10 of the present invention, once support structure 10 and container 12 are securely loaded onto the bed of the vehicle, leg 62 would be prevented from returning to the support position by the bed itself.

Figure 5:
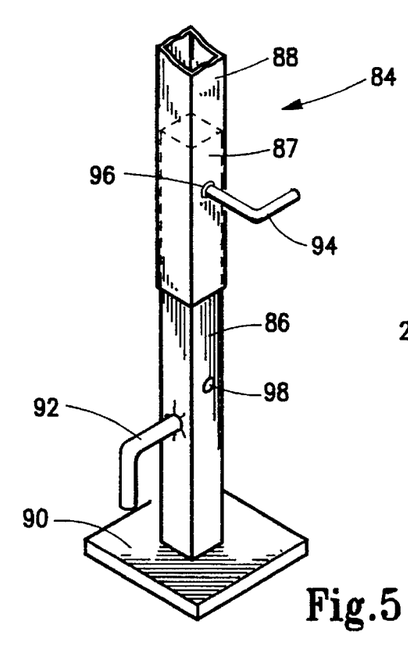
FIG. 5 is a perspective view partially broken away showing the telescoping adjustability of a representative leg of the second (rear) support structure according to the exemplary embodiment of the present invention.

FIG. 5 shows an exemplary construction for a representative leg 84 of second leg structure 80. It should be appreciated that the structure shown in FIG. 5 and described herein corresponds to leg 82 as well. As mentioned above, leg 84 is selectively adjustable between an extended state and a retracted state thereby to alter elevation and inclination of support frame 20 relative to support surface 14. Leg 84 comprises a hollow, tubular inner telescoping member 86 and a hollow, tubular outer telescoping member 88 each of square-shaped cross-section. Outer telescoping member 88 slidably receives an internal end portion 87 of member 86. Inner telescoping member 86 terminates in a ground engaging foot or end 90 opposite its internal end. Both of members 86 and 88 are provided with at least one hole 96 so that when these holes are aligned, a pin 94 may be removably inserted therethrough to allow for selective adjustment of telescoping members 86 and 88 into the extended state as is known in the art. Hole 98 permits adjustment to the retracted state. Member 86 is also provided with a handle 92 proximately to the ground engaging foot portion 90 to facilitate adjustment of the telescoping members 86 and 88.

Figure 6:
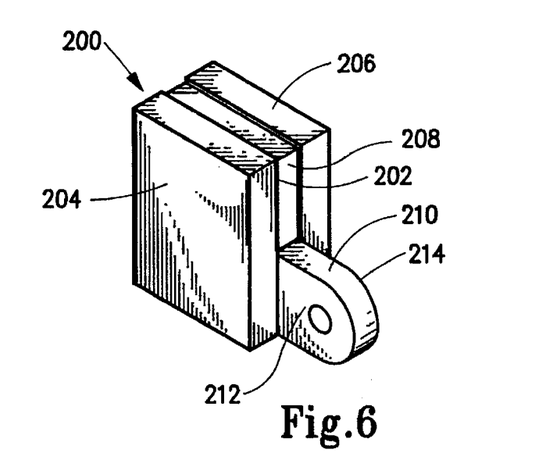
FIG. 6 is a perspective view of an alternative construction of the stop element according to the exemplary embodiment of the present invention.
Figures 7A, 7B:
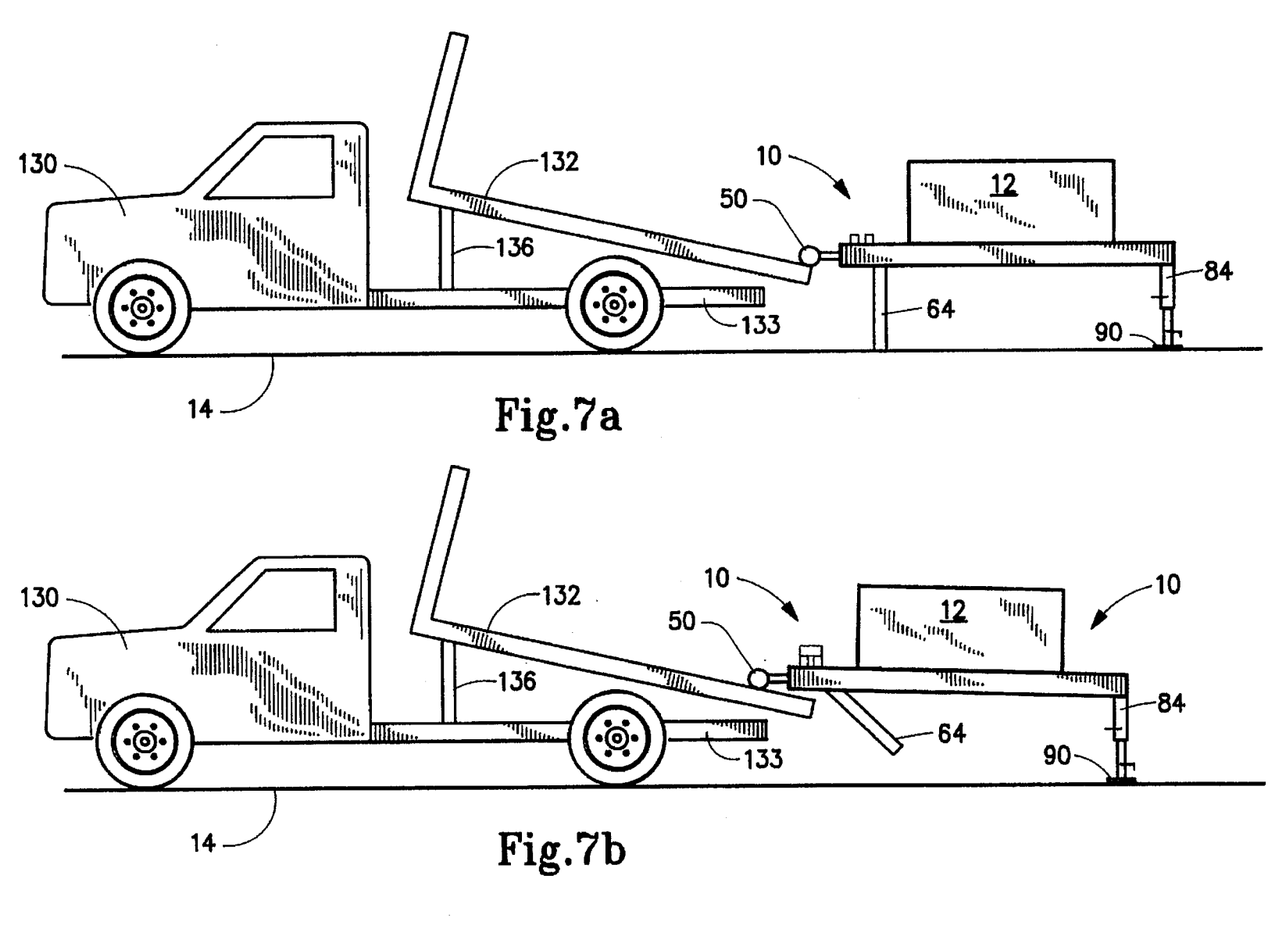
FIGS. 7(a)–7(d) are diagrammatic views illustrating the operation of the support structure according to the exemplary embodiment of the present invention as it and a container are loaded onto a vehicle.
Figure 7C:
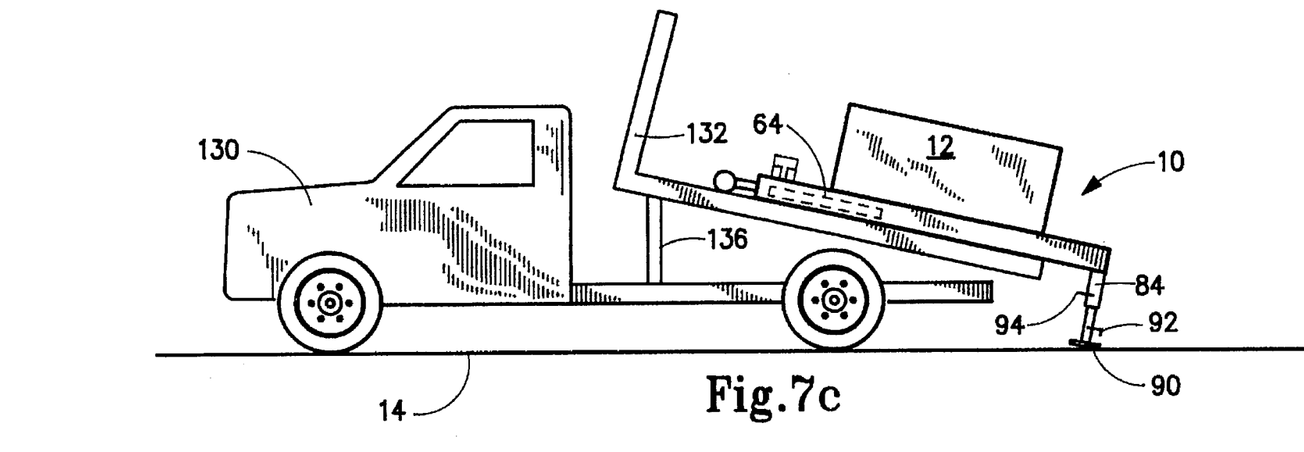
Figure 7D:
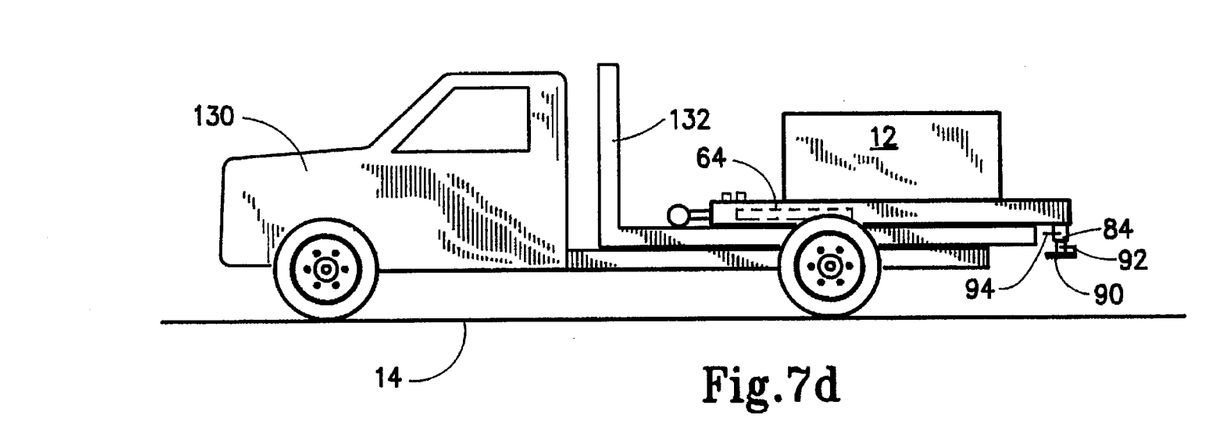

FIG. 6 shows an alternative construction for the stop element according to the exemplary embodiment of the present invention. Here, stop element 200 is formed as a pair of spaced apart plates, 204 and 206 which are of relatively equivalent dimensions. Crosspiece 210 is L-shaped In configuration and is interleaved between plates 204 and 206 and has its sides 212 and 214, respectively, affixed to inner surfaces 202 and 208. While this construction of stop element 200 is somewhat different than that described above with reference to FIG. 3, it should be understood that it operates in the same manner to either permit or prevent pivotability of leg 62 into the stowed position. The operation of the support structure 10 may now be better understood with the foregoing description of its preferred construction in mind. FIGS. 7(a)–7(d) show how support structure 10 may be loaded onto the cargo bed 132 of a vehicle 130. Vehicle 130 has its bed 132 adjustable relative to support surface 14 by a hydraulic lift 136. In FIG. 7(a) support structure 10 supports container 12 in an elevated state above the ground with legs 62 and 64 of first leg structure 60 arranged in the support position and legs 82 and 84 of second leg structure 80 adjusted to the extended state. Stop elements 100 and 102 are each positioned to obstruct pivotal rearward movement of legs 62 and 64, as described above with reference to FIG. 4(b). Initially, the operator of vehicle 130 elevates bed 132 relative to support surface 14 by adjusting the hydraulic lift mechanism 136 and positioning the vehicle so that the end 133 of the bed 132 engages roller bar 50. As the operator continues the rearward movement of vehicle 130, as shown in FIG. 7(b), roller bar 50 moves forwardly up inclined bed 132 to raise support structure 10 in a tilted position above surface 14. During this time stop elements 100 and 102 are in the position shown in FIG. 4(b) so that inadvertent pivoting of legs 62 and 64 due to contact with end 133 of bed 132 or otherwise is prevented. At this point, support structure 10 and container 12 become stabilized on bed 132, and the operator may now pivot stop elements 100 and 102 to the unobstructed position described in FIG. 4(a) and pivot each of legs 62 and 64 to the stowed position where they are oriented proximate to and alongside support frame 20.

In FIG. 7(b) the operator continues to back up vehicle 130 so that support structure 10 and container 12 slide upwardly onto bed 132 toward the front of vehicle 130. Once the support structure 10 and the container 12 are securely positioned on bed 132, the operator lowers the bed 132 to the horizontal position shown in FIG. 7(d) and selectively adjusts each of legs 82 and 84 to the retracted position by manipulation of the handles 92 and removable pins 94. At this point, the operator may transport container 12 and support structure 10 to a desired location without risk of second leg structure contacting the ground.

To unload support structure 10 and container 12, it should be understood that the opposite procedure is utilized. Mainly, the operator would first adjust legs 82 and 84 to the extended state and then gradually drive vehicle 130 forward until the support structure 10 is positioned as shown in FIG. 7(b), after which each of legs 62 and 64 may be pivoted from the stowed position to the support position and each of stop elements 100 and 102 may be adjusted so that they obstruct pivotal movement of legs 62 and 64. Further advancement of vehicle 130 to the position shown in FIG. 6(a) completes the off-loading procedure.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A support structure adapted to support vehicle-mounted equipment in an elevated stored state above ground and further adapted to mount onto a bed of the vehicle thereby to assist in loading and off-loading said equipment relative to said bed, comprising:

(a) a support frame adapted to receive and support said equipment in the stored state;

(b) a first rigid leg structure including a first pair of legs each pivotally mounted to said support frame on a respective pivot axis such that each of said legs includes a first portion located on one side of said axis, said first portion adapted to engage ground, and a second portion located on another side of said axis, each of said legs pivotable between a support position wherein said first portion engages the ground and a stowed position wherein said leg is oriented proximate to said support frame with said second portion extending into a region between said support frame and a respective said axis;

(c) a second rigid leg structure mounted to said support frame; and (d) a pair of stop elements each being selectively movable into the region between said support frame and the respective said axis of a respective one of said legs to define a stop position wherein said stop element obstructs the region thereby to prevent pivoting of said respective leg into the stowed position and movable out of the region to permit pivoting of said respective leg into the stowed position.

2. A support structure according to claim 1 wherein each of said legs pivots in a respective first plane and wherein each of said stop elements is movable in a second plane that is transverse to the first plane of its said respective leg.

3. A support structure according to claim 2 wherein said first leg structure is mounted interiorly of said support frame and each of said first pair of legs is operative to move toward said second leg structure when pivoted into the stowed position.

4. A support structure according to claim 1 wherein each of said stop elements is pivotally coupled to said support frame for movement into and out of said region.

5. A support structure according to claim 1 wherein said second rigid leg structure includes a second pair of legs.

6. A support structure according to claim 5 wherein said second pair of legs are selectively adjustable in length between an extended state and a retracted state.

7. A support structure according to claim 6 wherein each of said second pair of legs includes a hollowed upper portion and a lower portion telescopically received within said hollowed upper portion and including a removable pin insertable through said upper portion and said lower portion to selectively retain said legs between the extended state and the retracted state.

8. A support structure according to claim 7 including a handle connected to each said lower portion to facilitate manual adjustment of said second pair of legs between the extended state and the retracted state.

9. A support structure according to claim 1 wherein said support frame includes a pair of elongated members each having a first end portion mounted to a respective one of said first pair of legs and a second end portion mounted to said second leg structure, said elongated members interconnected at their first end portions by a roller bar which is journaled for rotation relative to said support frame.

10. A support structure according to claim 9 wherein said roller bar is rotatably supported by a pair of spaced apart axles.

11. A support structure adapted to support vehicle-mounted equipment in an elevated stored state above ground and further adapted to mount onto a bed of the vehicle thereby to assist in loading and off-loading said equipment relative to said bed, comprising:

(a) a support fame adapted to received and support said equipment in the stored state;

(b) a first rigid leg structure including a first pair of legs each pivotally mounted to said support frame on a respective pivot axle such that each leg includes a first portion located on one side of said axle, said first portion adapted to engage ground, and a second portion located on another side of said axle, each said leg pivotable between a support position wherein said first portion engages the ground and a stowed position wherein said leg is oriented proximate to said support frame with said second portion extending into a region between said support frame and said axle, said support frame constructed to prevent additional pivoting of said leg beyond the stowed position;

(c) a second rigid leg structure mounted to said support frame; and (d) a pair of stop elements each being selectively movable into the region between said support frame and said axle of a respective leg to define a stop position wherein said stop element obstructs the region thereby to inhibit pivoting of said leg into the stowed position and movable out of the region to permit pivoting of said leg into the stowed position, each of said stop elements pivotally coupled to said support frame by a crosspiece having a first end mounted to a bracket on said support frame and a second end connected to said stop element, each of said legs pivotable in a first plane and each said crosspiece and its associated one of said stop elements pivotable in a second plane which is perpendicular to said first plane.

12. A support structure adapted to support vehicle mounted equipment in an elevated stored state above ground and further adapted to mount onto a bed of the vehicle thereby to assist in loading and off-loading said equipment relative to said bed, comprising:

(a) a support frame adapted to receive and support said equipment in the stored state;

(b) a first rigid leg structure including a first pair of legs each pivotally mounted to said support frame on a respective pivot axis such that each of said legs includes a first portion located on one side of said axis, said first portion adapted to engage ground, and a second portion located on another side of said axis, each of said legs pivotable between a support position wherein said first portion engages the ground and a stowed position wherein said leg is oriented proximate to said support frame with said second portion extending into a region between said support frame and a respective said axis;

(c) a second rigid leg structure mounted to said support frame; and (d) a pair of stop elements each pivotally connected to said support frame and being selectively and independently movable relative to said first pair of legs into the region between said support frame and the respective axis of a respective one of said legs to define a stop position wherein said stop element obstructs the region thereby to prevent pivoting of said respective leg into the stowed position and movable out of the region to permit pivoting of said respective leg into the stowed position.

13. A support structure adapted to support vehicle-mounted equipment in an elevated stored state above ground and further adapted to mount onto a bed of the vehicle thereby to assist in loading and off-loading said equipment relative to said bed, comprising:

(a) a support frame adapted to receive and support said equipment in the stored state;

(b) a first rigid leg structure including a first pair of legs each pivotally mounted to said support frame on a respective pivot axle such that each leg includes a first portion located on one said of said axle, said first portion adapted to engage ground, and a second portion located on another side of said axle, each said leg pivotable between a support position wherein said first portion engages the ground and a stowed position wherein said leg is oriented proximate to said support frame with said second portion extending into a region between said support frame and said axle, said support frame constructed to prevent additional pivoting of said leg beyond the stowed position;

(c) a second rigid leg structure mounted to said frame; and (d) a pair of stop elements each being selectively movable into the region between said support frame and said axle of a respective leg to define a stop position wherein said stop element obstructs the region thereby to inhibit pivoting of said leg into the stowed position and movable out of the region to prevent pivoting of said leg into the stowed position.

14. A support structure according to claim 13 wherein each of said stop elements is rectangular in configuration and has a surface which is in a facing relationship to said second portion when a respective said leg is in the support position and said stop element is in the stop position.

15. A support structure according to claim 14 wherein said support frame includes a shoulder associated with each of said first pair of legs which operates as a barrier to prevent additional pivoting of the respective leg beyond the stowed position.

16. A support structure according to claim 15 wherein each of said shoulders is formed as a rectangular plate mounted to said support frame.

17. A support structure adapted to support vehicle-mounted equipment in an elevated stored state above ground and further adapted to mount onto a bed of the vehicle thereby to assist in loading and off-loading said equipment relative to said bed, comprising:

(a) a rectangular support frame adapted to receive and support said equipment in the stored;

(b) a first rigid leg structure including a first pair of legs each pivotally mounted interiorly of said support frame on a respective pivot axle such that each leg includes a first portion located on one side of said axle, said first portion adapted to engage ground, and a second portion located on another side of said axle, each said leg pivotable between a support position wherein said first portion engages the ground and a stowed position wherein said leg is oriented adjacent said support frame with said second portion extending into a region between said support frame and said axle, said support frame including a shoulder mounted to its interior which is operative to prevent additional pivoting of said leg beyond the stowed position:

(c) a second rigid leg structure mounted interiorly of said support fame, said second leg structure including a second pair of legs each selectively adjustable between an extended state and a retracted state thereby to alter elevation of said support frame relative to said support surface; and (d) a pair of stop elements each being selectively movable into the region between said frame and said axle of a respective one of said first pair of legs to define a stop position wherein said stop element obstructs the region thereby to prevent pivoting of said leg into the stowed position and movable out of the region to permit pivoting of said leg into the stowed position.

18. A support structure according to claim 17 wherein said support frame includes a pair of elongated beams each having a first end portion mounted to a respective one of said first pair of legs and a second end portion mounted to said second leg structure, said elongated beams interconnected at their first ends by a roller bar which is rotatably relative to said support frame.

19. A support structure according to claim 17 including a handle associated with each of said second pair of legs to facilitate adjustment of said second pair of legs between the extended state and the retracted state.

20. A support structure according to claim 17 wherein each of said legs is pivotal in a first plane and wherein said stop elements are each pivotally coupled to said support frame for movement in a second plane that is perpendicular to the first plane.

* * * * *